May 13, 1969 E. B. SEVETZ ET AL 3,443,791

TURBINE VANE ASSEMBLY

Filed Nov. 23, 1966 Sheet 1 of 3

INVENTORS
EDWARD B. SEVETZ
LESTON M. FREEMAN, JR.

BY Fishman + Van Kirk
ATTORNEYS

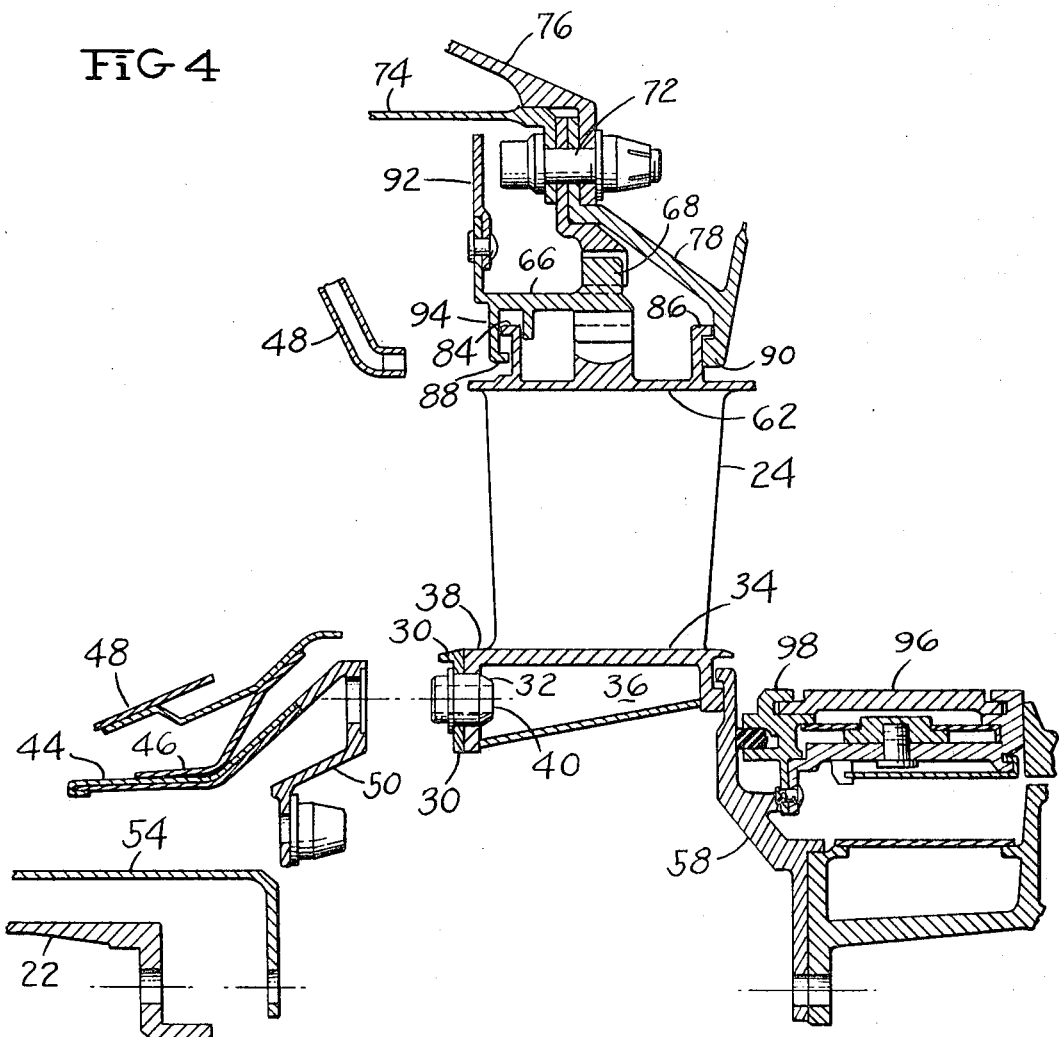

United States Patent Office 3,443,791
Patented May 13, 1969

3,443,791
TURBINE VANE ASSEMBLY
Edward B. Sevetz, West Hartford, Conn., and Leston M. Freeman, Jr., Swampscott, Mass., assignors to United Aircraft Corporation, East Hartford, Conn., a corporation of Delaware
Filed Nov. 23, 1966, Ser. No. 596,663
Int. Cl. F01d 5/14, 5/30
U.S. Cl. 253—39.1
12 Claims

ABSTRACT OF THE DISCLOSURE

A stator vane assembly is provided in which the vanes are assembled into and disassembled from the engine structure in magazine fashion. The individual stator vanes are secured to ring segments, preferably semicircular ring segments, and vanes are installed or removed from the engine in multiples merely by installing or removing the magazine elements.

---

This invention relates to a stator for a turbomachinery installation. More particularly, this invention relates to a removable turbine stator assembly for a gas turbine engine; the stator assembly comprising removable enlarged segments each carrying a plurality of stator vanes.

In gas turbine engines, particularly aircraft type gas turbine engines, the first stage turbine stator vanes are relatively perishable and must be inspected and replaced more often than some other elements in the engine. The need for this attention, both for inspection and replace-turbine stator vanes. For example, the first stage turbine stator vanes are directly exposed to the hot engine combustion gases immediately downstream of the combustion section of the engine. The first stage turbine stator vanes are thus exposed to temperatures near the highest temperature in the engine and; due to this comparatively hostile environment, which results in the vanes undergoing thermal stresses; wearing, warping, burning and metal fatigue results.

As well as being necessary to occasionally replace the first stage turbine stator vanes, it is also highly desirable to occasionally remove the first stage turbine stator vanes to inspect and/or replace other turbine assembly elements in the immediate downstream vicinity of the first stage turbine stator vanes. For example, the first stage turbine blade seal is subject to erosion due to thermally induced expansion and contraction of the turbine blades. This erosion, of course, results in gas leakage and a loss in engine efficiency.

Heretofore, removal of the first stage turbine stator vanes, especially in an engine having a one piece annular combustion chamber, has been an extremely time consuming undertaking usually requiring on the order of several hours. Stator vane removal has been thus time consuming because the vanes have been individually secured in the turbine assembly and thus each stator vane had to be individually disconnected and removed.

In the present invention the first stage turbine stator vanes are installed in magazine or assembly fashion; preferably two magazines or assemblies making up the entire first stage turbine stator unit. Although the invention will be discussed with respect to a stator unit made up of two magazines or assemblies, it will be clearly understood that the stator unit could be divided into more than two magazines or assemblies within the scope or teachings of this invention. The individual first stage turbine stator vanes are secured in an annular array to a retaining ring which positions the stator vanes around the edge. The retaining ring is split into two 180° segments and the engine casing and sealing structure can be moved aside to provide access to the stator vane magazines or assemblies. The stator vane magazines or assemblies can then be removed from the turbine unit so that one half of the stator vanes can be removed as a unit; thus, all of the stator vanes in the first stage can be quickly removed merely by removing the two magazines. A considerable time saving can be realized with the present invention in that all of the first stage turbine stator vanes can be removed from the engine for replacement and/or inspection of the vanes or other turbine elements in less than an hour. Alternatively, by operating on the retaining rings, the present invention permits the removal of single stator vanes rapidly and easily. It is also worthy of note that the present invention facilitates the inspection and replacement of elements such as the first stage turbine vane seals. That is, once the vane magazines or assemblies have been removed or moved aside, access to the downstream elements such as the seals is permitted and, through the simple expedient of moving a seal retainer, the seals may be removed.

Accordingly, one object of the present invention is to provide a novel stator vane assembly for a turbomachinery installation.

Another object of the present invention is to provide a novel stator vane assembly for a gas turbine engine.

Still another object of the present invention is to provide a novel stator vane assembly for an aircraft gas turbine engine.

Still another object of the present invention is to provide a novel stator vane assembly for the first stage turbine stator of a gas turbine engine.

Still another object of the present invention is to provide a novel gas turbine engine stator vane assembly which can be easily and quickly removed from the engine.

Still another object of the present invention is to provide a novel gas turbine engine stator vane assembly wherein a plurality of stator vanes can be removed from the engine or installed in the engine as a unit.

Still another object of the present invention is to provide a novel gas turbine engine stator vane assembly wherein a plurality of stator vanes can be installed or removed in magazine fashion.

Still another object of the present invention is to provide a novel gas turbine engine stator vane assembly in which pluralities of stator vanes are attached to a split ring for installation or removal as a unit.

Other objects and advantages will be apparent from the following detailed description and drawings.

In the drawings wherein like elements are numbered alike in the several figures:

FIGURE 4 is a view similar to FIGURE 3 showing the stator assembly in a state of partial disassembly in preparation for removal of stator vanes.

FIGURE 6 depicts the removal of first stage turbine blade seals in accordance with the present invention.

Figure 1:
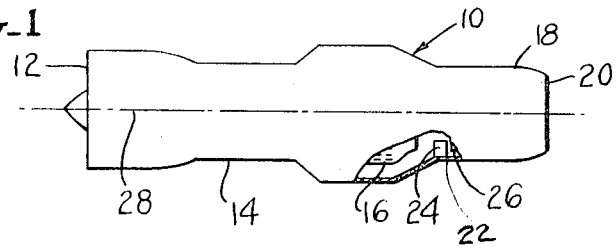
FIGURE 1 is a representative showing of an aircraft gas turbine engine.

Referring now to FIGURE 1, an aircraft gas turbine engine 10 is shown. Engine 10 has an air inlet 12, a compression section 14, a combustion section 16 having an annular combustion liner, a turbine section 18 and an exhaust nozzle 20. Turbine 18 has an outer annular casing 22 around the interior of which are placed one or more stages of turbine stator vanes 24, each stage leading to a rotor unit 26. Stator vanes 24 are in an annular array around engine axis 28 and are positioned substantially radially with respect to axis 28.

The basic operation of the engine of FIGURE 1 is in accordance with the well known operation of gas turbine engines. Air enters inlet 12, is compressed in compressor section 14 and is then delivered to burner section 16 where fuel is added and burned to produce a high energy, high temperature gas stream. The combustion gas stream is then expanded through turbine section 18 where work is extracted by the turbine rotor 26 to drive the compressor, and the combustion gas stream is then discharged rearwardly of the engine through exhaust nozzle 20, generating forward thrust.

Figure 2:
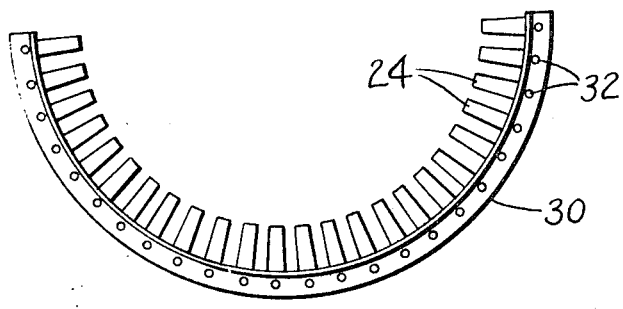
FIGURE 2 is an elevation view of a preferred embodiment of one half of a first stage stator vane assembly in accordance with the present invention, FIGURE 2 being a view looking downstream from a point immediately upstream of the first stage stator assembly.

Referring now to FIGURE 2, a view is shown of the bottom half of the first stage turbine stator vane assembly. The view of FIGURE 2 is taken at a point slightly upstream of the first stage turbine stator vane assembly, and it will be understood that the upper half of the assembly is similar to the lower half shown in FIGURE 2 so that the total assembly is symmetrical and annular about engine axis 28. As shown in FIGURE 2, the individual stator vanes 24 are connected to an arcuate segment or section 30 of a split retaining ring by piloting means which comprise connecting pins 32. Split ring section 30 is a semicircular section, and it is referred to as a "split ring" because it constitutes one half of a ring assembly which is annular about axis 28. The lower half 30 of the split ring is shown in FIGURE 2 and it will be understood that the upper half is symmetrical with the lower half about axis 28 to form the complete split ring. The assembly shown in FIGURE 2 constitutes one half of the entire first stage turbine stator vane assembly, and it is a magazine type assembly in that the individual vanes 24 in a complete one half of the stator assembly are pinned to ring section 30 to form a single unit.

Figure 3:
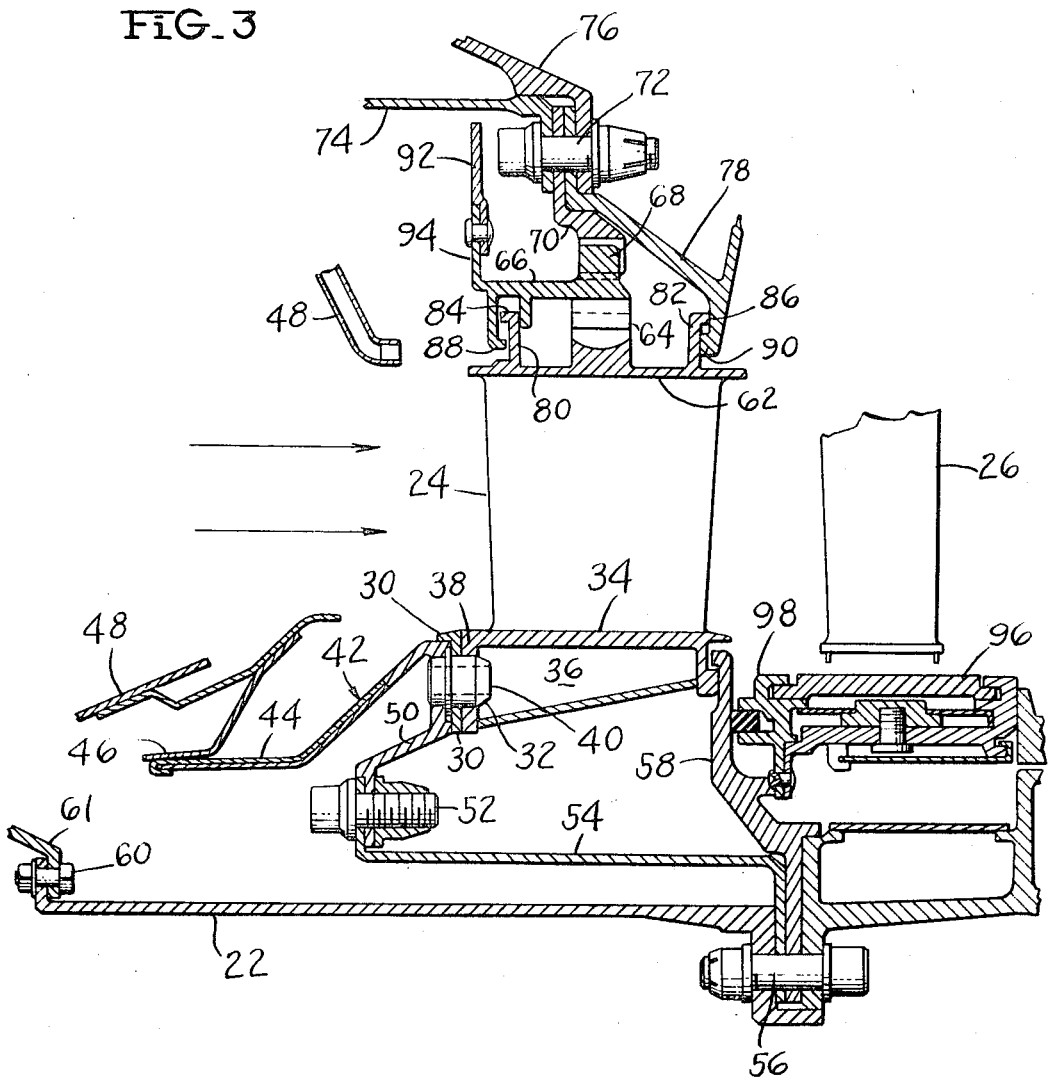
FIGURE 3 is a view along line 3—3 of FIGURE 2 showing the stator assembly in its fully installed state.

Referring now to FIGURE 3, details of the stator vane support and retention structure are shown. While one vane 24 is shown in side elevation in FIGURE 3, it will be understood that similar structure is provided for each of the vanes with some of the structure being common. It will also be understood that engine axis 28 is located some distance above FIGURE 3.

The outer end of vane 24 has a platform section 34 which has a hollow interior for forming a manifold 36. Manifold 36 communicates with coolant flow passages in the interior of vane 24 to provide a cooling flow through the vane. The front portion 38 of the platform end abutts against semicircular split ring section 30, and pin 32 passes through aligned openings in ring 30 and front portion 38 to secure the outer end of stator vane 24 to split ring section 30. A passageway 40 in pin 32 provides the entrance for coolant to be delivered to manifold 36.

A one piece seal assembly, indicated generally at 42, is also secured to split ring section 30 by pin 32. One piece seal assembly 42 is annular about engine axis 28. An extending annular portion 44 of seal assembly 42 abutts the outwardly disposed side of a member 46 extending from the outer side of combustion liner 48. Extending portion 44, member 46 and combustion liner 48 are all annular about engine axis 28, and the engine combustion gases are delivered from inside combustion liner 48 to first stage turbine stator vanes 24 as indicated by the arrows. An annular support section 50 for seal assembly 42 is secured by a bolt 52 to an annular inner turbine section casing 54, and casing 54 is in turn secured by bolt 56 to outer turbine section casing 22. Bolt 56 also supports annular divider or diaphragm element 58 which serves to provide the trailing edge support and seal for platform section 34. The forward end of casing 22 is secured by another bolt 60 to upstream outer casing structure 61 of the engine.

Still referring to FIGURE 3, the inner platform 62 of stator vane 24 is joined by a spline connection 64 to the outer portion of an annular shroud 66. The inner portion of annular shroud 66 is in turn connected through a spline 68 to an inner end support member 70. Inner end support member 70 is connected by bolt 72 to annular inner shroud 74 and also to annular inner casing member 76. An additional support member 78 for the trailing end of inner platform 62 is also secured by bolt 72 to inner casing structure 76. A pair of positioning fingers 80 and 82 respectively having end lugs 84 and 86 extend from inner platform 62 inwardly towards the engine centerline with lug 84 pointing upstream and lug 86 pointing downstream. Lugs 84 and 86 are opposed by lugs 88 and 90, respectively, to prevent accidental removal of a vane 24 by limiting motion radially outward in the event of a failure in the support structure at the outer end of the stator vane. An extending annular barrier element 92 which is pinned to inner ring segment 94 of annular shroud 66 serves to prevent bolt 72 from entering the combustion gas flow and passing through the turbine in the event that bolt 72 should fail.

The structure described above with regard to FIGURE 3 constitutes a first stage stator vane 24 with its inner end and outer end supports and sealing structure. The vane, as shown in FIGURE 3, is in the installed and operating position for engine operation. It will, of course, be borne in mind that a plurality of vanes 24 constituting one half of the vanes in the first stage vane assembly are pinned to semicircular split ring section 30 and may be considered to be a magazine containing one half of the first stage stator vanes. It should also be borne in mind that the other one half of the first stage turbine stator vanes are carried by a mating split ring section.

Referring now to FIGURE 4, the structure of FIGURE 3 is shown in an intermediate disassembly stage in preparation for removal of the stator vanes. In order to reach the intermediate disassembly state shown in FIGURE 4, bolts 56 and 60 are first removed, and outer casing 22 is slid to the left thus assuming the position shown in FIGURE 4. The movement of outer casing 22 to the left exposes bolt 52 (FIGURE 3). Bolt 52 is removed to free inner casing 54 so that it may be slid to the left to the position shown in FIGURE 4. In will be understood that there is a plurality of each of the bolts 56, 60 and 52 arranged in an annular array around engine axis 28, and all of the bolts in these annular arrays are removed to allow for the leftward sliding of outer casing 22 and inner casing 54. After inner casing 54 is moved to the left, seal unit 42 is then disengaged from pin 32, and the annular seal assembly 42 is slid to the left to the position shown in FIGURE 4. The leftward movement of annular seal assembly 42 completes the intermediate stage in preparation for removal of the one half of the stator vane assembly composed of split ring section 30 and the vanes 24 which are pinned to ring 30 by pins 32.

Figure 5:
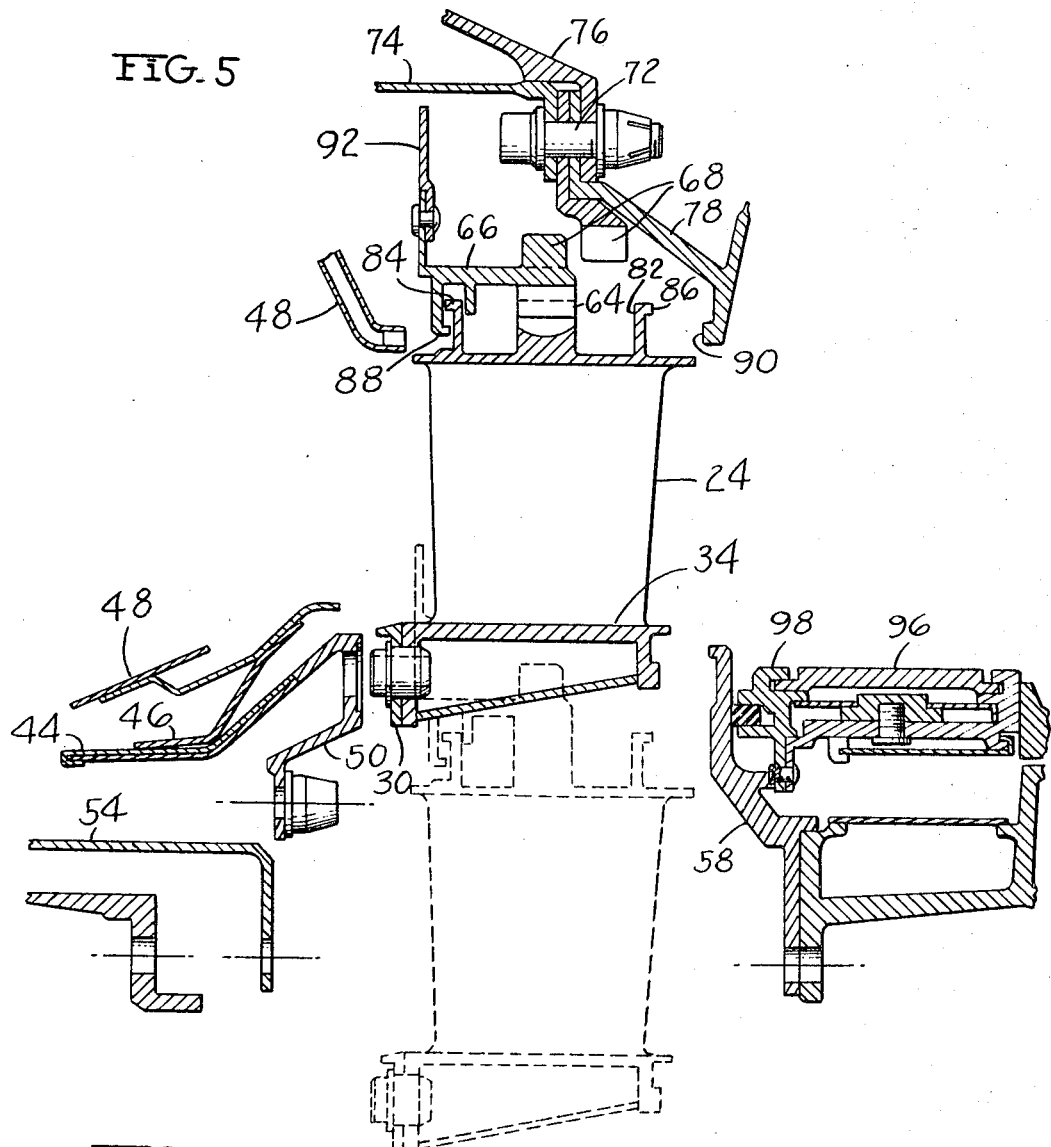
FIGURE 5 is another view similar to FIGURES 3 and 4 showing the stator assembly in the process of being removed from the engine.

Referring now to FIGURE 5, the final steps in the removal of the 180° stator assembly unit of ring 30 and vanes 24 is shown. The final steps of removal involve sliding the entire unit comprising split ring section 30, vanes 24, shroud 66, inner ring segment 94 and barrier element 92 leftward to disengage spline 68. This leftward movement disengages finger 82 and lug 86 for radially outward movement past lug 90. Since the outer end of vane 24 has been previously disconnected from all casing structure, the 180° stator assembly unit made up of split ring section 30 and the vanes 24 pinned thereto is now free to move radially outward to be removed from the engine as indicated by the structure shown in broken lines in FIGURE 5. This removal of the entire 180° stator segment means, of course, that the entire first stage stator assembly can be removed merely by removing two magazine units. After removal of the first stage stator assembly, the engine elements immediately downstream therefrom such as the first stage turbine blade seals, one of which is indicated generally at 96, are then readily accessible for inspection and/or replacement.

The stator assembly can be readily reassembled with the elements previously removed or with new stator vanes if required merely by reversing the disassembly steps described above. Accordingly, reassembly would be accomplished by inserting the magazine units of the split ring sections 30 and the vanes pinned thereto to the position shown in full lines in FIGURE 5. The stator segments would then be moved to the right to reengage spline 68, and seal assembly 42 would then be remounted on pins 32. Next, inner casing 54 would be slid to the right and would be secured to support section 50 of seal assembly 42 by bolt 52. Outer casing 22 would then be slid to the right to be secured by bolts 56 and 60 to complete the reassembly procedure.

As an additional feature, it should also be pointed out that individual vane removal rather than removal of a complete 180° assembly of vanes can also be accomplished with the present invention. Individual vane removal is achieved by proceeding to the configuration shown in full lines in FIGURE 5 and then removing pins 32 to disengage split ring section 30 from front platform portion 38. Disengagement of the split ring leaves the individual vanes 24 hanging by the interaction of lugs 84 and 88. Removal of the individual vanes can then be accomplished merely by pivoting the vane to be removed clockwise about the point of interference between lugs 84 and 88 to disengage spline 64 and allow lug 84 to pass by lug 88.

FIGURE 6 depicts the removal of a first stage turbine blade seal 96 in accordance with the present invention. Once the stator vane assemblies have been removed, diaphragm element 58 may be moved to the position shown in FIGURE 6. Diaphragm element 58 and seal retainer 98 may be moved as a unit or they can be separately moved to the left. Accordingly, the moving of elements 58 and 98 enables seal 96 to be lifted out for inspection.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A stator assembly for a turbomachinery unit including:
    annular casing means, said casing means being movable between an operating position and a maintenance position and being normally in said operating position;
    annular seal means adapted for sealing contact in said turbomachinery unit, said seal means being movable between an operating position and a maintenance position and being normally in said operating position;
    first detachable connecting means for detachably connecting said seal means to said casing means in the operating position of each of said casing means and said seal means;
    at least one arcuate segment;
    a plurality of piloting means for securing said arcuate segment with respect to part of said annular seal means in said operating position of said seal means;
    a plurality of individual stator elements, each of said stator elements being secured at one end thereof with respect to said arcuate segment and said seal means in said operative position of said seal means by at least one of said piloting means;
    said stator elements and said arcuate element being a unitary magazine element forming a segment of said stator assembly; and
    second detachable connecting means at the other end of each of said stator elements for detachably securing said other end of each of said stator elements with respect to support structure of said turbomachinery unit, said second detachable connecting means including means for allowing axial and then radial movement of said stator elements with respect to said turbomachinery unit upon removal of said magazine from said turbomachinery unit;
    said magazine element being movable as a unit axially with respect to said turbomachinery unit to a maintenance position in said turbomachinery unit upon the detaching of said seal means from said casing means and the moving of said casing means to said maintenance position and upon the disconnecting of said seal means from said arcuate segment and the moving of said seal means to said maintenance position; and
    said magazine unit being removable as a unit radially with respect to said turbomachinery unit from said turbomachinery unit upon movement of said magazine unit to said maintenance position.

2. A stator assembly for a turbomachinery unit as in claim 1 wherein:
    said seal means is a one piece ring.

3. A stator assembly for a turbomachinery unit as in claim 1 including:
    two of said arcuate segments, each of said segments being 180° in arc, each of said segments and the stator elements attached thereto forming a magazine unit, said segments cooperating to form an annular ring to form said stator assembly from said magazine units.

4. A stator assembly for a turbomachinery unit as in claim 1 wherein:
    said second detachable connecting means includes spline connecting means and two pair of opposed and normally spaced apart lugs.

5. A stator assembly for a turbomachinery unit as in claim 1 wherein:
    said piloting means are bushings pinning together said seal means, said segment and said stator elements.

6. A stator assembly for a turbomachinery unit as in claim 1 wherein:
    said stator elements have cooling passage means therein; and including:
        mainfold means at said one end of each of said stator elements for distributing coolant flow to said cooling passage means; and wherein:
            each of said piloting means includes passage means for the passage of coolant flow to one of said manifold means.

7. A stator assembly for the turbine of a gas turbine engine, said stator assembly having an axis and said stator assembly including:
    annular casing means about said axis, said casing means being slidable between an operating position and a maintenance position and being normally in said operating position;
    annular seal means about said axis adapted for sealing contact in said gas turbine engine, said seal means being slidable between an operating position and a maintenance position and being normally in said operating position;
    first detachable connecting means for detachably connecting said seal means to said casing means in said operating position of each of said casing means and said seal means;
    a split annular ring about said axis, said split ring having at least two segments of not more than 180° each;
    a plurality of piloting means for securing said segments of said split ring with respect to said seal means;
    a plurality of individual turbine stator vanes arranged in an annular array about said axis, a group of said stator vanes being secured at the outer end thereof with respect to each segment of said split ring in the operative position of said split ring by at least one of said piloting means;
    each of said segments and the stator vanes secured thereto defining a unitary magazine element forming a section of said stator assembly; and second detachable connecting means at the inner end of
each of said stator vanes for detachably securing said
inner ends of said stator vanes to engine structure,
said second detachable connecting means including
means for allowing axial and then radial movement
of said stator elements with respect to said axis of
said gas turbine engine upon removal of said magazine elements from said gas turbine engine;

each of said magazines being movable as a unit axially
with respect to said axis of said gas turbine engine
to a maintenance position in said gas turbine engine
upon the detaching of said seal means from said casing means and the sliding of said casing means to said
maintenance position and upon the disconnecting of
said seal means from said split ring and the sliding
of said seal means to said maintenance position; and each of said magazines being removable as a unit radially with respect to said gas turbine engine from
said gas turbine engine upon movement of each of
said magazines to said maintenance position.

8. A stator assembly for the turbine of a gas turbine
engine as in claim 7 wherein:
said stator vane assembly is the first stage stator vane
assembly.

9. A stator assembly for the turbine of a gas turbine
engine as in claim 7 wherein:
said seal means is a one piece ring.

10. A stator assembly for the turbine of a gas turbine
engine as in claim 7 wherein:
said second detachable connecting means includes
spline connecting means and two pair of opposed and
normally spaced apart lugs.

11. A stator assembly for the turbine of a gas turbine
engine as in claim 7 wherein:
said piloting means are bushings pinning together said
seal means, said segments of said split annular ring
and said stator vanes.

12. A stator assembly for the turbine of a gas turbine
engine as in claim 7 wherein:
said stator vanes have cooling passage means therein;
and including:
manifold means at said one end of each of said
stator elements for distributing coolant flow to
said cooling passage means; and wherein:
each of said piloting means includes passage
means for the passage of coolant flow to
one of said manifold means.

References Cited

UNITED STATES PATENTS

| | | |
|---|---|---|
| 2,916,874 | 12/1959 | Worobel. |
| 2,932,485 | 4/1960 | Small et al. |
| 3,295,824 | 1/1967 | Woodwell et al. |
| 3,300,180 | 1/1967 | Tuttle et al. |
| 3,301,526 | 1/1967 | Chamberlain. |
| 3,351,319 | 11/1967 | Frost _____ 253—78 |
| 3,362,681 | 1/1968 | Smuland. |

EVERETTE A. POWELL, Jr., *Primary Examiner.*

U.S. Cl. X.R.

253—78